Patented Feb. 10, 1953

2,628,221

UNITED STATES PATENT OFFICE 2,628,221

COPOLYMERS OF VINYL ESTERS AND TERTIARY AMINO NITROGEN-CONTAINING COMPOUNDS AND PROCESS FOR PRODUCING SAME

Frank D. Marsh, Wilmington, Del., assignor to E. I. du Pont de Nemours and Company, Wilmington, Del., a corporation of Delaware No Drawing. Application April 3, 1951, Serial No. 219,109

14 Claims. (Cl. 260—85.7)

1

This invention relates to the production of new and useful copolymers and, more particularly, it relates to the production of new, acid-soluble copolymers of vinyl esters and certain ethylenically unsaturated tertiary amino-nitrogen-containing compounds.

It is an object of this invention to produce certain new and useful copolymers.

It is another object of this invention to produce certain new and useful copolymers of vinyl esters and ethylenically unsaturated tertiary amino-nitrogen-containing compounds.

It is still another object of this invention to produce copolymers of vinyl esters and N,N-disubstituted ethylenically unsaturated amino-nitrogen-containing compounds that are free from amido nitrogen.

Other objects of this invention will be apparent from the following description.

The tertiary amino-nitrogen-containing polymers of this invention are characterized by having a main polymer chain consisting of carbon atoms only and lateral substituents containing a radical from the class consisting of acyloxy and hydroxyl radicals, and amido-nitrogen-free aliphatic, including cycloaliphatic, tertiary amino-nitrogen-containing groups in which the atom vicinal to the main polymer chain is attached to other atoms by single bonds only, and the carbon atom to which the tertiary amino-nitrogen atom is attached is linked to only one other carbon atom.

The amino-nitrogen-containing polymers of this invention contain tertiary amino-nitrogen groups and can therefore be used in systems in which formaldehyde is present without being rendered insoluble through cross-linking. The tertiary amino-nitrogen group makes possible the direct formation of quaternary salts that are useful as anti-static agents for fibers and films. The polymers of this invention are also useful as dyeing aids in the dyeing of cellulose acetate, as anti-halation agents, as textile fiber sizes, and as anti-snagging agents for nylon textiles.

The amino-nitrogen-containing polyvinyl alcohols of this invention are useful for conversion to textile filaments and fibers and by virtue of their water solubility find applications as wetting and dispersing agents, etc. The presence of the hydroxyl groups makes possible their conversion to polyesters which find use in coatings and the like.

The copolymers of this invention, for example, may be obtained by charging a pressure reactor with a liquid reaction medium, the vinyl ester,

2 the N,N-disubstituted ethylenically unsaturated amine and a catalyst. The charged reactor is cooled to 0° C., the oxygen substantially removed by sweeping the system with oxygen-free nitrogen, or by evacuation, or both. The charged reactor is then heated with agitation for from one to twenty-four hours and thereafter discharged. The desired product is isolated from the reaction mixture by distillation, drowning in a non-solvent, or other known methods. The resulting copolymer may be hydrolyzed by methanolysis to replace the acyloxy groups with hydroxyl groups.

The following examples are given to illustrate, in detail, processes for producing the copolymers of this invention, it being understood that these examples are not intended to limit the invention thereto.

Example I

A pressure vessel was charged with 760 grams of vinyl acetate, 40 grams of N,N-dimethylallylamine, 16 grams of azobisisobutyronitrile as a catalyst, and 800 grams of tertiary butyl alcohol as a solvent. The charged reactor was cooled in Dry Ice-acetone mixture and swept with oxygen-free nitrogen. The reactor was then closed and the contents heated with agitation for eight hours at 80° C. The reaction mixture was allowed to cool to room temperature, the reactor opened and the contents discharged. Solvent and unreacted monomers were removed by heating at 100° C. to 150° C. under 1–2 mm. pressure. There were obtained 640 grams of a light tan solid which was soluble in dilute acetic acid and was determined to be a copolymer of vinyl acetate and N,N-dimethylallylamine. Its inherent viscosity at 0.5% concentration in chloroform at 25° C. was 0.21. Analysis showed the product to correspond to one containing 5.7% of N,N-dimethylallylamine.

The above polymer was converted to a tertiary amino-nitrogen-containing polyvinyl alcohol as follows:

A 5-liter reactor equipped with an efficient mechanical stirrer, dropping funnel and reflux condenser was charged with 1000 grams of methanol containing one gram of sodium in solution. The solution was heated to reflux, with stirring, and 550 grams of the vinyl acetate/N,N-dimethylallylamine copolymer, prepared as described above, was dissolved in 1000 grams of methanol and added over a six-hour period. The reaction mixture was heated to reflux for an additional two hours and then allowed to cool to room temperature. The cold solution was diluted with an approximately equal volume of acetone, the product which separated was removed by filtration and washed with a 1:1 acetone-methanol mixture. The washed product was dried at 60° C. under reduced pressure. The yield was 296 grams. The product was found to be soluble in solvents for polyvinyl alcohol. Analysis showed it to contain 1.19% nitrogen, to have a saponification number of 0.45, and a neutralization equivalent of 1012.

*Example II*

Example I was repeated with a charge consisting of 80 grams of vinyl acetate, 20 grams of N,N-dimethylallylamine, 2 grams of azobisisobutyronitrile, and 100 grams of tertiary butyl alcohol. The product had an inherent viscosity of 0.14 at 0.5% concentration in chloroform at 25° C. and was determined to be a copolymer of vinyl acetate and N,N-dimethylallylamine. Nitrogen analysis showed it to correspond to a product containing 14.4% of N,N-dimethylallylamine. The product was soluble in acetone and other solvents for polyvinyl acetate, and also in dilute acetic acid.

*Example III*

Example I was repeated with a charge consisting of 95 grams of vinyl acetate, 5 grams of N,N-dimethyl-beta (vinyloxy) ethyl amine, 2 grams of azobisisobutyronitrile, and 100 grams of tertiary butyl alcohol. From the reaction mixture there were recovered 79.2 grams of a copolymer of vinyl acetate and N,N-dimethyl-beta (vinyloxy) ethyl amine having an inherent viscosity of 0.27 at 0.5% concentration in chloroform at 25° C. Nitrogen analysis of the product showed it to correspond to one containing 7.1% of the N,N-dimethyl-beta (vinyloxy) ethyl amine. Films cast from solution in acetone were clear and hard.

*Example IV*

Example I was repeated with a charge consisting of 95 grams of vinyl acetate, 5 grams of N,N-dimethyl-2-methylallylamine, 2 grams of azobisisobutyronitrile, and 100 grams of isopropyl alcohol as the solvent. From the reaction mixture there were isolated 52 grams of a copolymer of vinyl acetate and N,N-dimethyl-2-methylallylamine having an inherent viscosity of 0.09 at 0.5% concentration in chloroform at 25° C. Nitrogen analysis showed the polymer to correspond to one containing 7.8% of N,N-dimethyl-2-methylallylamine. The polymer was soluble in dilute acetic acid, acetone, butyl acetate, and other solvents for polyvinyl acetate. Films cast from solution were clear and hard.

*Example V*

Example I was repeated with a charge consisting of 106.4 grams of vinyl acetate, 26.6 grams of N,N-dimethyl-2,3-butadienylamine, 2.7 grams of azobisisobutyronitrile and 198 grams of tertiary butyl alcohol. After eight hours' reaction at reflux (ca. 80° C.) the reaction mixture was allowed to cool and the contents of the reactor discharged. From the reaction mixture there were recovered 28.7 grams of a copolymer of vinyl acetate and N,N-dimethyl-2,3-butadienylamine having an inherent viscosity of 0.11 at 0.5% concentration in chloroform. Nitrogen analysis showed the product to correspond to one containing 16.7% of N,N-dimethyl-2,3-butadienylamine. The product was soluble in dilute acetic acid, acetone, butyl acetate, and other solvents for polyvinyl acetate. Films cast from solution were clear and hard.

The polymerization may be effected at temperatures of from 10° C. to 150° C. Usually, however, good reaction rates are obtained within the range of 60° C. to 125° C., and this constitutes the preferred operating temperature range.

In practice, the polymerization is effected under autogenous pressure because this is convenient and practical in most cases. If desired, however, super-pressures of up to 100 or more atmospheres may be used, or the reaction can be conducted at atmospheric pressure under a suitable condensing system to prevent monomer loss.

The nitrogen-containing compounds of this invention are copolymers of a vinyl ester with a polymerizable N,N-disubstituted ethylenically unsaturated amine that is free from amido-nitrogen.

As the vinyl ester component there may be used any ester of vinyl alcohol with a carboxylic acid. Examples of such esters are vinyl acetate, vinyl propionate, vinyl butyrate, vinyl acetobutyrate, vinyl laurate, vinyl stearate, vinyl crotonate, vinyl linoleate, and the like.

In the preparation of the products of this invention there may be used any polymerizable, amido-nitrogen-free N,N-disubstituted ethylenically unsaturated aliphatic, including cycloaliphatic, amine. Examples of such amines, in addition to those employed in the examples, are N,N - diamylallylamine; N,N - dipropylmethallylamine; N,N - ethylpentylcrotylamine; N,N - dibutyl-3-ethylallylamine; vinyloxy-N,N-dimethylethylamine; 4 - dimethylaminocyclohexyl vinyl ether; vinyl N,N-dimethylaminoacetate; and N,N-dimethylvinylamine. The preferred N,N-disubstituted ethylenically unsaturated amines are the N,N-disubstituted alkenylmonoamines because of their availability and ease with which they copolymerize with the vinyl ester.

Example I has illustrated methanolysis with sodium in methanol. It is to be understood that in place of methanol there can be used water and other lower saturated monohydric alcohols such as ethanol, propanol, etc. Because of availability and low cost, methanol is preferred.

In place of sodium, other alkali metals or alkali metal hydroxides can be used. Sodium is preferred because of its availability and effectiveness.

Although the vinyl ester and N,N-disubstituted ethylenically unsaturated amine can be copolymerized in any desired proportion, in order to provide polymers having a sufficient degree of basicity, it is preferred that the N-disubstituted amine component constitute no less than 5%, and preferably between 10% and 75% of the total polymer composition.

In the preparation of the polymers, it is desirable to include a polymerization catalyst in the charge in order to achieve a practical rate of reaction. The preferred catalysts are those which yield unstable free radicals under the conditions of reaction. Examples of such catalysts are organic and inorganic peroxides, e. g., hydrogen peroxide, benzoyl peroxide, tert. butyl hydroperoxide, diethyl peroxide, etc., azo compounds described in U. S. Patent 2,471,959, such as alpha,alpha'-azodiisobutyronitrile, alpha-alpha'-(alpha-gamma-dimethylvaleronitrile), dimethyl alpha,alpha' - azodiisobutyrate, 1,1'-azodicyclohexanecarbonitrile, etc.

The amount of catalyst may be as low as 0.1% by weight of the monomers employed in the polymerization process of this invention. Usually good reaction rates, with good yields of product, are obtained employing 0.5% to 5.0% by weight of catalyst and that constitutes the preferred catalyst concentration.

The copolymerization can be carried out under a variety of conditions. Although not essential, it is convenient in practice to use a liquid medium which dissolves the monomers and catalyst. Any reaction medium that is substantially inert to the materials in the reaction mass can be used, including those which are solvents for the copolymers. Examples of suitable reaction media are benzene, toluene, the xylenes, dioxane, methyl isobutyl ketone, etc. If desired, the polymerization can be effected in an aqueous medium with or without dispersing or emulsifying agents.

Excellent catalysts for use in aqueous systems are water-soluble metal thiocyanates in combination with hydrogen peroxide or an organic hydroperoxide, as disclosed in copending application U. S. Serial No. 138,525, filed by E. G. Howard on January 13, 1950, or combinations of salts of sodium hydrazobismethane-sulfonate with hydrogen peroxide and a cupric or ferric ion, as disclosed in copending application U. S. Serial No. 141,867, filed by E. G. Howard on February 1, 1950, now Patent 2,589,258.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

I claim:

1. A tertiary aminonitrogen-containing polymer of a N,N-disubstituted monoethylenically unsaturated amine and a vinyl alcohol ester of an aliphatic monocarboxylic acid characterized in having a main polymer chain consisting of carbon atoms only and lateral substituents containing a radical from the class consisting of acyloxy and hydroxyl radicals, and amidonitrogen-free aliphatic, including cycloaliphatic, tertiary aminonitrogen-containing groups in which the atom vicinal to the main polymer chain is attached to other atoms by single bonds only and the carbon to which the tertiary aminonitrogen is linked is attached to only one other carbon atom.

2. A tertiary aminonitrogen-containing polymer of a N,N-disubstituted monoethylenically unsaturated amine and a vinyl alcohol ester of an aliphatic monocarboxylic acid characterized in having a main polymer chain consisting of carbon atoms only and lateral substituents containing hydroxyl radicals and amidonitrogen-free aliphatic, including cycloaliphatic, tertiary aminonitrogen-containing groups in which the atom vicinal to the main polymer chain is attached to other atoms by single bonds only and the carbon to which the tertiary aminonitrogen is linked is attached to one other carbon atom.

3. A copolymer of a vinyl alcohol ester of an aliphatic monocarboxylic acid and an amidonitrogen-free N,N-disubstituted monoethylenically unsaturated amine taken from the group consisting of aliphatic and cycloaliphatic amines.

4. A copolymer of a vinyl alcohol ester of an aliphatic monocarboxylic acid and an amidonitrogen-free N,N-disubstituted monoethylenically unsaturated aliphatic amine.

5. A copolymer of vinyl acetate and an amidonitrogen-free N,N-disubstituted monoethylenically unsaturated amine taken from the group consisting of aliphatic and cycloaliphatic amines.

6. A copolymer of vinyl acetate and an amidonitrogen-free N,N-disubstituted monoethylenically unsaturated aliphatic amine.

7. A copolymer of vinyl acetate and N,N-dimethylallylamine.

8. A copolymer of vinyl acetate and N,N-dimethylbeta (vinyloxy) ethyl amine.

9. The polymerization process which comprises reacting, at a temperature of 10° to 150° C., a vinyl alcohol ester of an aliphatic monocarboxylic acid and an amidonitrogen-free N,N-disubstituted monoethylenically unsaturated amine taken from the group consisting of aliphatic and cycloaliphatic amines in the presence of a polymerization catalyst.

10. The polymerization process which comprises reacting, at a temperature of 10° to 150° C., a vinyl alcohol ester of an aliphatic monocarboxylic acid and an amidonitrogen-free N,N-disubstituted monoethylenically unsaturated amine taken from the group consisting of aliphatic and cycloaliphatic amines in the presence of a polymerization catalyst and a liquid reaction medium that is substantially inert to the reaction mass.

11. The polymerization process which comprises reacting, at a temperature of 10° to 150° C., a vinyl alcohol ester of an aliphatic monocarboxylic acid and an amidonitrogen-free N,N-disubstituted monoethylenically unsaturated amine taken from the group consisting of aliphatic and cycloaliphatic amines in the presence of a polymerization catalyst and a liquid solvent reaction medium that is substantially inert to the reaction mass.

12. The polymerization process which comprises reacting, at a temperature of 10° to 150° C., vinyl acetate and an amidonitrogen-free N,N-disubstituted monoethylenically unsaturated aliphatic amine in the presence of a polymerization catalyst and a liquid reaction medium.

13. The product obtained by hydrolyzing the copolymer of claim 3.

14. The product obtained by hydrolyzing the copolymer of claim 4.

FRANK D. MARSH.

REFERENCES CITED

The following references are of record in the file of this patent:

UNITED STATES PATENTS

| Number | Name | Date |
| --- | --- | --- |
| 2,138,763 | Graves | Nov. 29, 1938 |